US006885312B1

(12) United States Patent

Kirkpatrick

(10) Patent No.: US 6,885,312 B1
(45) Date of Patent: Apr. 26, 2005

(54) METHOD AND SYSTEM FOR MAPPING VEHICLE PARKING

(75) Inventor: Mark A. Kirkpatrick, Conyer, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 30 days.

(21) Appl. No.: 10/154,913

(22) Filed: May 28, 2002

(51) Int. Cl.[7] .......................... G08G 1/14; G08G 1/01; G08G 1/04; G08G 1/054; G08G 1/065; B60Q 1/48

(52) U.S. Cl. .................... 340/932.2; 340/933; 340/934; 340/937; 340/942; 340/943

(58) Field of Search ...................... 340/932.2, 933–934, 340/937, 942–943, 988, 990, 995; 701/200

(56) References Cited

U.S. PATENT DOCUMENTS 5,091,727 A * 2/1992 Mahmood ................ 340/932.2
5,432,508 A * 7/1995 Jackson ................... 340/932.2
5,910,782 A * 6/1999 Schmitt et al. ........ 340/995.12
5,940,481 A * 8/1999 Zeitman ...................... 705/13
6,147,624 A * 11/2000 Clapper ................... 340/932.2
6,249,233 B1 * 6/2001 Rosenberg et al. ...... 340/932.2
6,285,297 B1 * 9/2001 Ball ........................ 340/932.2
6,340,935 B1 * 1/2002 Hall ........................ 340/932.2
6,426,708 B1 * 7/2002 Trajkovic et al. ........ 340/932.2
6,501,391 B1 * 12/2002 Racunas, Jr. ............ 340/932.2
6,559,776 B1 * 5/2003 Katz ....................... 340/932.2
6,650,250 B1 * 11/2003 Muraki .................... 340/932.2

* cited by examiner

*Primary Examiner*—Jeffery Hofsass
*Assistant Examiner*—Lam Pham
(74) *Attorney, Agent, or Firm*—Cantor Colburn LLP

(57) ABSTRACT

A method and system for determining the vacancy of a parking space is described that allows a customer to remotely receive information about parking space availability before arriving at a parking lot or structure. This system allows the customer to determine whether there are parking spaces available to park a vehicle and where such parking space(s) are located before the customer arrives at the parking lot or structure.

44 Claims, 4 Drawing Sheets

METHOD AND SYSTEM FOR MAPPING VEHICLE PARKING

BACKGROUND

1. Field of the Invention

The present invention relates to a method and system for mapping vehicle parking remotely through use of a receiver that collects information from nearby transmitters at a parking site.

2. Background of the Invention

Time has become an increasingly precious commodity in today's society. Thus, businesses continually devise time-saving processes to decrease customer idle time during service. While decreasing idle time, customers may spend additional time shopping or other activities that promote more business. Furthermore, businesses that have increased their efficiency by decreasing customer idle time in time-consuming processes tend to attract more customers who are drawn by the efficiency of such businesses.

One such time-consuming process that tends to detract some customers from going to shopping centers is the inevitable search for a parking space. Often times, a customer will spend an unnecessary and excessive amount of time driving through rows of parked vehicles to locate an open parking space. This process may waste an inordinate amount of time and frustrate the customer. Holidays and sales periods increase the scarcity of open parking spaces. It is common for multiple drivers to seek the same parking space, thereby creating a stress related to being the first to pull a vehicle into an empty space. It has been increasingly common for disputes to occur between drivers that are seeking the same parking space.

The resulting search to find that elusive parking space often wastes fuel and time. For example, sometimes customers will avoid the chore of shopping because of the difficulty in finding a parking space. Thus, it is desirable to provide a method and system to improve the efficiency of seeking open parking spaces thereby preventing customer search time for a parking space or idle time waiting for a parking space to become available.

SUMMARY OF THE INVENTION

The present invention is a method and system for receiving remote signals from a transmitter that maps vehicle parking spaces in a nearby parking lot of a garage. Drivers of vehicles may receive a mapping of the vehicle parking spaces. The mapping includes, for example, an indication of which parking spaces, if any, are vacant. Thus, drivers are directed to the parking spaces that are available. This will decrease the time the driver spends in the parking lot and increase the throughput of the business.

As used herein and throughout this disclosure, "receiver" is defined as an electronic device that receives signals remotely. Preferably, the receiver also transmits signals. The receiver further has a screen or other display that allows a user to choose desired items on a screen menu, such as, for example, different levels of a given parking structure. A user can choose a parking lot or parking level by using an indicating instrument and pointing to various items on a menu. Such an indicating instrument could include, for example, a stylus, a pointer, keyboard, mouse-control, or other similar means. Also, optionally, the screen can be touch-sensitive so a user can just touch on an item displayed on the screen to select the parking lot or level for mapping.

The receiver further is capable of receiving signals from a transmitter that sends signals in a localized area. Thus, the receiver receives such a signal when the receiver is within a broadcast area of the transmitter. The transmitter is electrically connected to a parking lot or parking structure that is using the transmitter to transmit signals that map out the available and occupied parking spaces to the receivers in the possession of drivers. The transmitter can send signals that indicate to the customer that the receiver is within the broadcast range of the business, thereby inducing the customer to conduct a review of the parking spaces in the area. Additionally, the business also may transmit its real-time parking availability to potential customers via a signal to receivers in its broadcast area.

An exemplary embodiment of the present invention is a method of broadcasting remote information relating to parking lot space availability. The method includes determining the parking lot space availability, transmitting remote information relating to the parking lot availability of the business, and receiving the remote information.

Another exemplary implementation of the present invention is a method of transmitting information related to a parking space. The method includes determining whether a parking space is vacant, generating a signal related to the parking space vacancy, transmitting the signal remotely through a transmitter, receiving the signal by a receiver, and displaying the signal as information related to the parking space vacancy.

Another exemplary embodiment of the present invention is a method for operating a parking facility. The method includes providing a receiver to a customer entering the facility, transmitting information related to availability of parking spaces, receiving that information by the receiver, and conveying that information to a user.

Yet another exemplary embodiment of the present invention is a system for relaying information about parking space vacancy. The system includes a device for determining vacancy of a parking space, a signal that contains information relating to the vacancy of the parking space, a transmitter for transmitting the signal remotely to a transmitting area, and a receiver for receiving the remote signal from the transmitter when the signal is within the transmitting area.

In yet another exemplary embodiment, the present invention is a system for relaying information about parking space vacancy. The system includes means for determining vacancy of a parking space, means for generating a signal that contains information relating to the vacancy of the parking space, means for transmitting the signal remotely, means for receiving the remote signal from the means for transmitting when the signal is within a transmitting area of the means for transmitting, and means for providing that information to the user

DETAILED DESCRIPTION OF PREFERRED EMBODIMENTS

An exemplary method and system of the present invention includes a receiver that detects and processes remote signals from transmitters within a broadcast range of the transmitter. The receivers allow drivers to receive parking availability information from nearby parking lots and structures, thereby promoting efficient use of time for the driver by reducing search time for a parking space and idle time waiting for a parking space to become available. Preferably, by the time the driver has reached the parking lot or structure, the driver already has some indication whether there is a parking space available and, if so, where such a parking space may be located.

As a non-limiting example, a customer operating a vehicle within a certain limited vicinity of a business receives parking space availability information remotely through a receiver in the vehicle. When the customer arrives at the parking lot or structure, the information indicates the location of an available parking space. The customer thus drives the vehicle towards the parking space. If the parking space is filled before the customer reaches it, the customer may choose another parking space to park the vehicle. Thus, customer search and idle time with respect to locating an available parking space is minimized.

Figure 1:
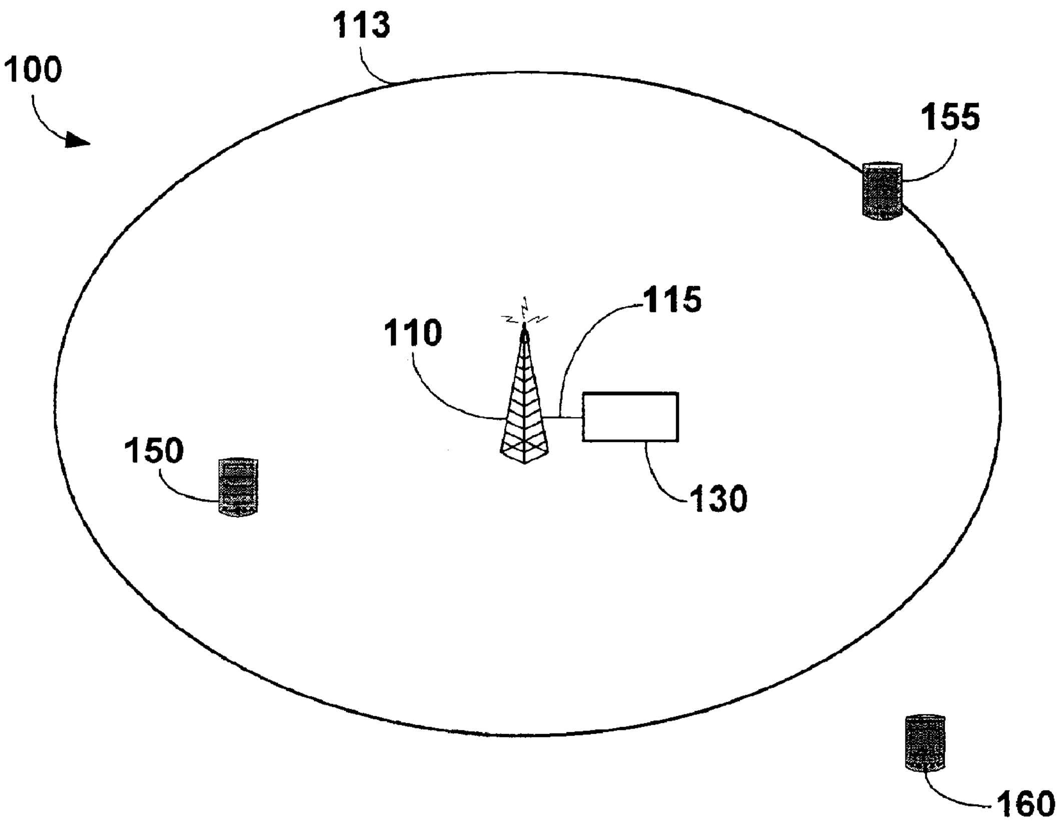
FIG. 1 shows an exemplary embodiment of the present invention showing a transmitter transmitting vehicle parking mapping information to a given transmitting area with various receivers in a region in and out of the transmitting area.

FIG. 1 shows an exemplary embodiment of the present invention as a system 100 for mapping parking lots or structures. A transmitter 110 is an example of a transmitting means for transmitting signals via airwaves. The transmitting means may be, for example, a radio tower, a satellite dish, or the like. The transmitter 110 may have a limited range, being able to detect, transmit, or accept signals from a transmitting area 113. Such a transmitting area 113 may be created by the limitations in the strength range for the transmitter 110 for transmitting and receiving signals. Alternatively, the area 113 may be pre-set to limit the area in which the transmitter 110 may transmit or detect signals.

A reason for limiting the area 113 for transmitting signals would be, for example, for a business 130, which may be a parking lot or parking structure, to ensure that the driver is close enough to be able to access the parking lot or structure relatively quickly. Because of the relatively fleeting availability of parking spaces, it is most helpful to a customer if the parking lot is close to the customer when the customer is considering a parking space. As a non-limiting example, a shopping mall may prefer that its customers that use a remote parking mapping system be within a two-mile range of the shopping mall to ensure that the spaces are likely still available when the customer arrives at the shopping mall.

The transmitter 110 transmits and receives signals from remote receivers 150, 155 and 160. Such receivers 150, 155 and 160 may be part of or incorporated into existing electronic devices that are primarily used for other purposes. Such existing devices include, for example, personal data assistants ("PDA"), cellular telephones that have PDA-style screens, remote-Internet-access electronics, two-way pagers, global positioning system ("GPS") devices which have keyboards and screens, or the like. All such devices have other uses other than receiving parking mapping information.

Alternatively, the receivers 150, 155 and 160 may be stand-alone devices that are primarily used for receiving parking mapping information from a transmitter 110. Standalone receivers may be provided by parking lots or structures themselves that utilize such a system 100 and may be designed to receive signals only at designated wavelengths that are specific to the parking lots or structures. Optionally, the stand-alone receivers may be provided through corporate alliances and therefore usable at numerous parking lots or businesses, some of these establishments being part of one organization or, alternatively, being competitors in the same line of business. The receivers 150, 155 and 160 may have a screen with a menu of parking lot choices or parking level choices, depending on the type of parking information received. A stylus may be used to select desired items on a screen. Alternatively, receivers 150, 155 and 160 may have a keyboard to allow a customer to type out a list of desired parking structures, areas, or levels. Optionally, a voice-recognition software may be implemented into the receivers 150, 155 and 160 to take verbal instructions instead of the instructions using the menu option through a stylus or keyboard.

Alternatively, a parking lot or structure 130 may offer customers an option where customers are permitted to "reserve" an available parking space by indicating an intent, through their receivers 150, 155 and 160, to occupy that space. The parking lot or structure then would indicate that parking space as occupied for all other drivers that are viewing a mapping of the parking lot or structure 130. Whether the receivers 150, 155 and 160 are part of an existing system having other purposes or are stand-alone devices with no other function, each receiver should preferably have an alphanumeric code that serves as an identifier to distinguish it from others. This identifier permits that parking lot or structure 130 to register only select drivers into their "pre-occupied reservation system". When each receiver 150, 155 and 160 is distinguishable from another, the parking lot or structure 130 can identify which customer is signaling in a parking reservation notice.

Furthermore, receiver 150, 155 and 160 may be integrated into a platform, such as a panel of a vehicle. For example, such receiver may be offered as options on vehicle dashboards alongside or as additional features of GPS systems. In such a case, a customer typically would not be able to remove such a receiver from the vehicle under normal conditions.

Alternatively, receiver 150, 155 and 160 may be portable devices, similar to or integrated into other portable electronic devices, such as, for example, a PDA. In this case, such receivers may be easily transported from one place to another without the constraint of the receiver having been integrated into a permanent platform, like that of a vehicle described above. Portable or stand-alone receivers could be transferable from one vehicle to another. Alternatively, such receivers could be used without a vehicle, such as, for example, during driving of a motorcycle, riding a bicycle, walking, hiking, or the like.

Receivers 150, 155 and 160 may be at various distances from the transmitter 110 at any point in time. For example, receiver 150 may receive information, such as a parking map, from a transmitter 110 when the receiver 150 is within the transmitting area 113 of the transmitter 110. Receiver 160, which is outside of the transmitting area 113, may not be able to receive any signals from the transmitter 110. As receiver 155 enters the transmitting area 113, a signal is detected and processed by the receiver 155. Conversely, as receiver 155 leaves the transmitting area 113, any signal emanating from the transmitter 110 may no longer be detectable by the receiver 155. The transmitting area 113 may not have definite or strict boundaries because it may be affected by external factors, such as power of transmitter 110, interference from nearby buildings and structures, electromagnetic waves, or the like.

Although labeled and described as a "transmitter", transmitter 110 is not limited only to transmitting signals to receivers 150, 155 and 160. Transmitter 110 also may receive signals from receivers 150, 155 and 160. Likewise, although labeled as "receivers", receivers 150, 155 and 160 are not limited only to receiving signals from transmitter 110, and further also may transmit such signals. This dual capability of receiving and transmitting signals of information by both the transmitter 110 and the receivers 150, 155 and 160 allows interactive communication between customers carrying such receivers 150, 155 and 160 and a business 130 utilizing such a system 100.

Signals originate from the business 130 and may be relayed through electrical connector 115 to and transmitted by the transmitter 110. Electrical connector 115 may be, for example, standard electrical cables, and may connect to the business 130 network via, for example, standard Ethernet connections. Alternatively, signals that originate from the business 130 may be transmitted remotely to transmitter 110, which then transmits the signal to the transmitting area 113.

Figure 2:
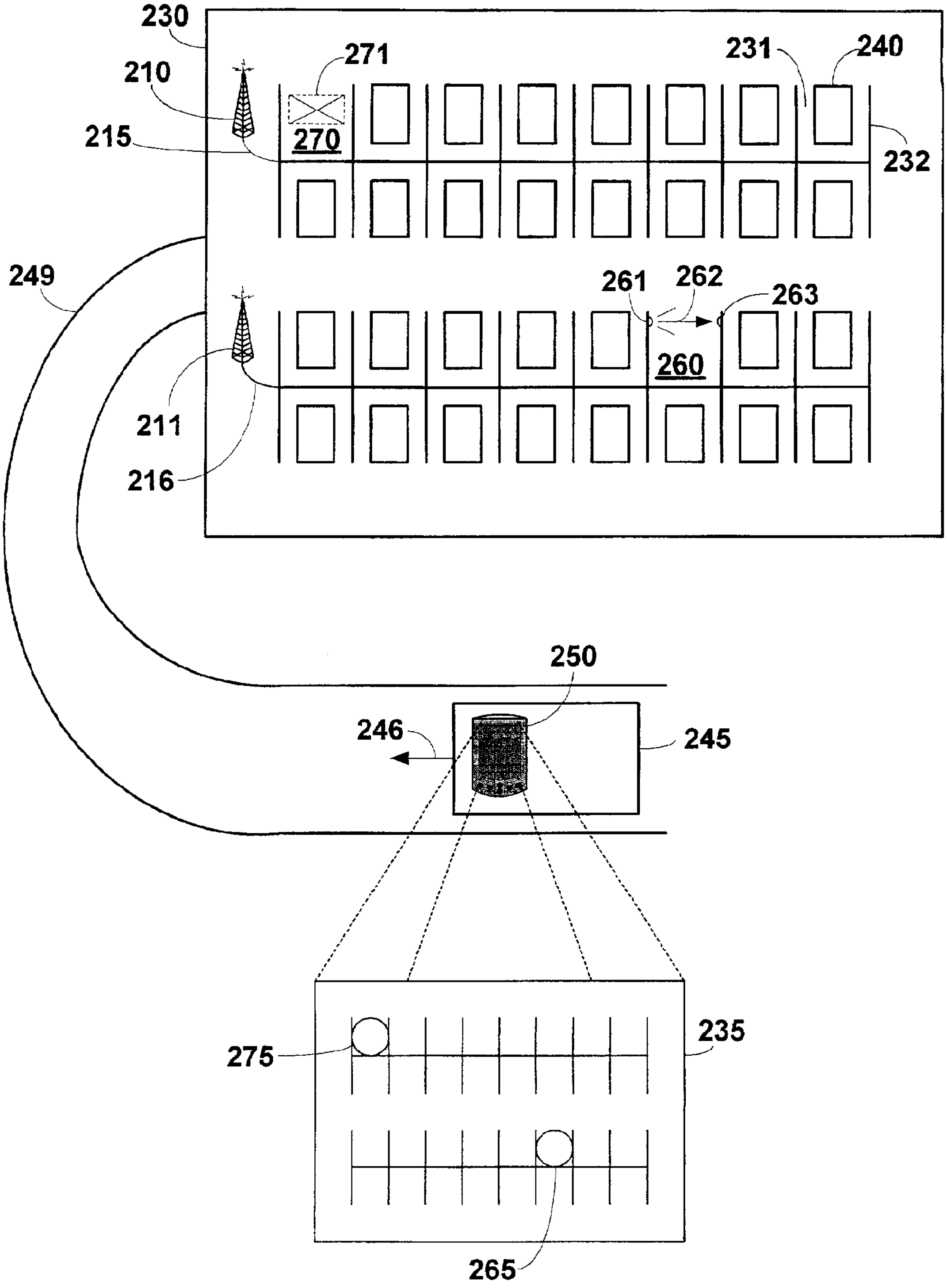
FIG. 2 shows an exemplary embodiment of the present invention showing a parking lot having such an exemplary embodiment of the system of the present invention.

Another exemplary embodiment of the present invention is depicted in FIG. 2. The business 230 as depicted in FIG. 2 may be a parking lot or parking structure. Although an exemplary parking lot 230 is shown for simplicity, the system and method of the present invention is applicable to any parking lot or parking structure using the techniques and configurations described herein, and equivalents thereof.

In the exemplary embodiment of the present invention as depicted in FIG. 2, a business 230 is shown as a vehicle parking lot having multiple parking spaces 231. Although the exemplary business shown in this figure is a parking lot to be used primarily for parking vehicles, such as automobiles, the business may be any establishment that is used to accommodate one or more vehicles. The term "vehicles", as used herein and throughout this disclosure, means automobiles, trucks, buses, tractors, dune buggies, motorcycles, scooters, ships, boats, jet skis, airplanes, helicopters, trains trolleys, gondolas, farm equipment; and the like.

Each parking space 231 typically is of a size to accommodate a vehicle 240. Each parking space 231 is bordered by a boundary line 232, which may be a visible line (e.g., painted on the floor or ground), rope, railing, wall or the like. In the exemplary embodiment shown in FIG. 2, there are four total horizontal rows of parking spaces 231. This exemplary embodiment is shown for sake of clarity and is not intended to be limiting of the present invention. The system and method of the present invention may apply to any parking area having one or more spaces 231 for accommodating a vehicle 240.

Each parking space 231 preferably has an occupancy indicating means for determining whether the parking space is occupied. Such means may include, but are not limited to, infrared indicators, acoustic indicators, lasers, optical indicators, weight sensors, magnetic sensors, or the like.

In the exemplary embodiment shown in FIG. 2, the parking space 260 is equipped with an infrared system for determining whether the space is occupied. The infrared system may include an infrared light transmitter 261 that emits infrared light 262 at a given wavelength frequency. The infrared light 262 may be positioned on a barrier 232 on the border of the parking space 260 and directed to emit infrared light 262 into the parking space 260. Preferably, the path of the infrared light 262 is such that it crosses a portion of the parking space 260 that is most likely to be occupied by any type of vehicle 240 that parks in the space 260. For example, whether a full sized automobile or a scooter parks in the space 260, the path of the infrared light 262 should contact such a vehicle. The path of the infrared light 262 may be perpendicular, parallel, or diagonal with respect to the length of the vehicle. Optionally, the infrared light emitter 261 may be positioned on a floor space relatively under the vehicle pointing up unto an underside of the vehicle, or positioned above the vehicle pointing down onto a topside of the vehicle. The size and shape of the space 260 will be a factor in how any emitter and detector will be positioned with respect to the space 260.

In whichever position the infrared light emitter 261 is placed, an infrared light receiver should detect the reflected or received light to determine whether the light has been affected by an object in the light path. The infrared light emitter 261 may be able to receive reflected infrared light back into it, thereby signaling that an object, such as a vehicle, is in the path of the emitted light 262. Alternatively, a separate infrared light receiver 263 may be positioned to receive infrared light 262 emitted by the infrared emitter 261. Acoustic, laser or optical indicators would operate generally similarly to the infrared indicators, except for the use of different emitters and detectors.

Another exemplary means for indicating occupancy of the parking space 231 is a weight sensor 271 that is shown in an exemplary unoccupied parking space 270. The weight sensor may be, but not limited to, a floor mat, a sheet or a sensor that may sense weight or impedance of an object above, below, or near its surface. In whatever format that the sensor 271 is, when a vehicle 240 occupies space 270, the sensor 271 detects the presence of the vehicle 204 from the vehicle's weight or impedance.

Although parking lot 230 is shown having a parking space 260 accommodating an infrared occupancy detecting system in parking space 260 and a weight sensor system in parking space 270, such systems are not limiting of the exemplary systems and methods of the present invention. Other systems that are capable of detecting the presence of an object in a given space may be used as a means for determining the occupancy of a parking space 231. Furthermore, one or more different means for determining parking space occupancy may be used in the same parking lot 230, and is dependent on such factors as cost, space, infrastructure, and the like.

As shown in the exemplary embodiment of FIG. 2, each of the exemplary occupancy determining systems shown with respect to parking space 260 and 270 can generate a signal relating to the occupancy condition of its respective parking space. Such signals may be sent via electrical connectors 215 and 216 to transmitters 210 and 211, respectively. Alternatively, in lieu of the electrical connectors 215 and 216, signals generated by the occupancy determining systems may be sent remotely to the transmitters 210 and 211. The transmitters 210 and 211 receive information from all parking spaces having signal connections to them. In the exemplary embodiment shown in FIG. 2, the top two rows of parking spaces send occupancy information signals to transmitter 210 and the bottom two rows of parking spaces send occupancy information signals to transmitter 211. Such a configuration is merely exemplary and other configurations of parking spaces to transmitters are possible.

In the exemplary embodiment shown in FIG. 2, a vehicle 245 heads in the direction indicated by the arrow 246 on a path 249 leading to the parking lot 230. The vehicle 245 is equipped with or contains a receiver 250 that is capable of receiving signals from transmitters 210 and 211. In order to receive signals from transmitters 210 and 211, the receiver 250 should be in a transmitting area of the transmitters, as illustrated in FIG. 1. The signals received by the receiver 250 when within the transmitting area of the transmitters 210 and 211 include information about occupancy status of the parking spaces 231 in parking lot 230. Thus, the operator of the vehicle 245 can determine whether to continue on the path 249 to parking lot 230 or travel to another parking lot (not shown).

The receiver 250 transforms the signal information received from the transmitters 210 and 211 into a visual map or text that the operator of the vehicle 245 should be able to understand. As shown in the exemplary embodiment of FIG. 2, receiver 250 has created a virtual map 235 of the parking lot 230 for the operator of vehicle 245 to consider. The virtual map 235 indicates unoccupied spaces 265 and 275, which correspond to unoccupied spaces 260 and 270, respectively, in the parking lot 230. Thus, the operator of vehicle 245 may determine if any unoccupied spaces are available in parking lot 230 before traveling further down path 249 to the parking lot 230. Furthermore, the operator may determine, before reaching the parking lot 230, where any such unoccupied spaces are located so to travel directly to such spaces and prevent wasted time searching for unoccupied spaces.

In the exemplary virtual map 235 shown in FIG. 2, only the unoccupied spaces 265 and 275 are highlighted. Alternatively, the map virtual 235 may show only the occupied parking spaces. Optionally, the virtual map 235 may indicate both occupied and unoccupied parking spaces. The operator of the vehicle may select the type of virtual visual map that is projected on the receiver 250 through option buttons on the receiver 250.

Although FIG. 2 has been shown with a receiver 250 in a vehicle 245 that displays a visual map 235 of a parking lot 230, the receiver 250 is not limited to displaying only visual maps. Other means for displaying and relaying information relating to parking lot space availability are possible.

Figure 3:
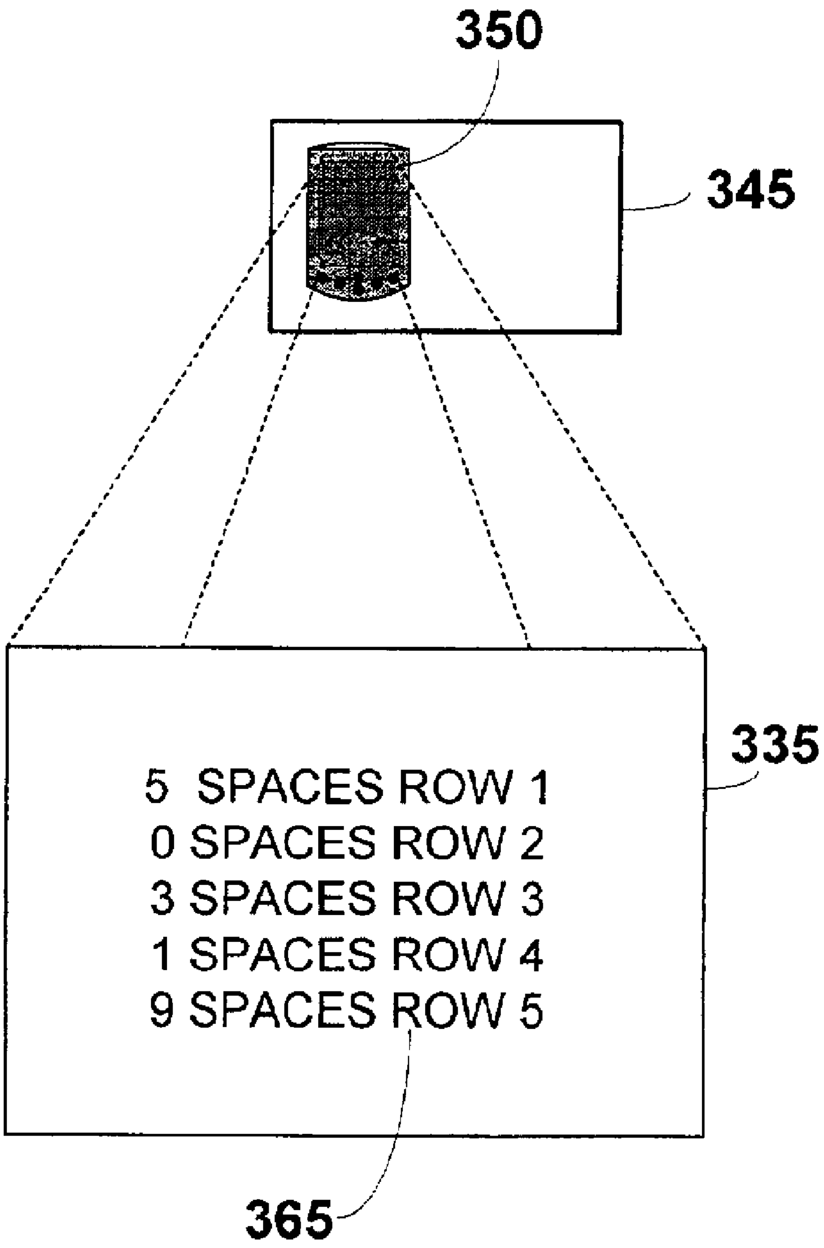
FIG. 3 shows another exemplary embodiment of the present invention showing a receiver presenting information as text.

In another exemplary embodiment shown in FIG. 3, a receiver 350 may display information received from a transmitter 110 on a screen 335 as text 365 so that any operator or passenger in vehicle 345 may read and determine whether parking spaces are open, and where such spaces would be.

Figure 4:
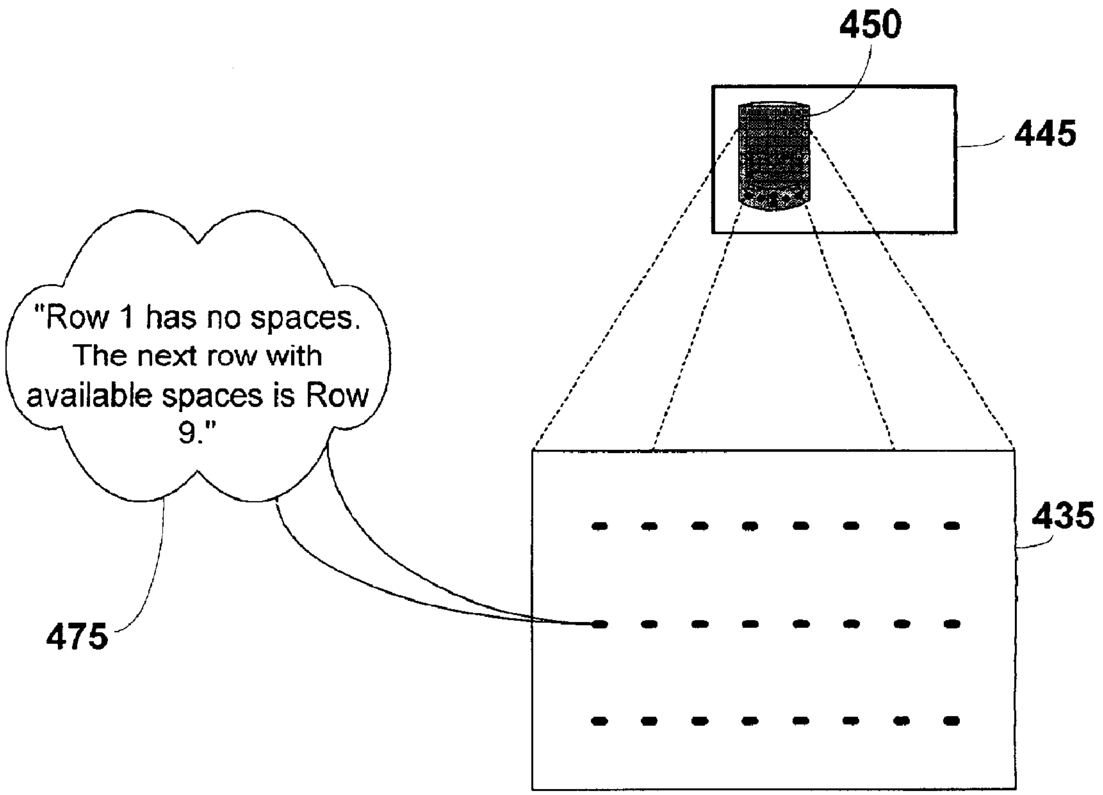
FIG. 4 shows another exemplary embodiment of the present invention showing a receiver presenting information as audio.

In yet another exemplary embodiment shown in FIG. 4, a receiver 450 may present the information received from a transmitter 110 as a voice 475 broadcast by a speaker 435. The voice 475 may be a computer reading of information that was received by the receiver 450. Alternatively, the voice 475 may be a pre-recorded voice of an employee of the business 130 being played directly to the operator and passengers of a vehicle 445.

Optionally, a receiver 150 may have one or more display or projecting means, thereby allowing the users of the receiver multiple means for conveying the message. For example, it may be desirable for a receiver 150 to relay any received information in any combination of a map, text, or voice, or all three. Optionally, an operator of the receiver 150 may be able to control which one of the three exemplary means for information dissemination are desired.

One of the advantages of the method and system of this invention is the minimization of time that a customer has to spend looking for a parking-space. Thus, the method and system of the present invention may be applied to any business that desires to save time for its customers by eliminating time that the customer has to spend looking for parking at the business. Exemplary businesses that would benefit from the present invention include, but are not limited to, shopping centers, malls, theaters, cinemas, stadiums, airport parking, restaurants, retail stores, grocery stores, convenient stores, discount warehouses, boat docks, railroad terminals, or the like.

Because less time has to be spent looking for parking spaces, more time is available for shopping or otherwise patronizing the business. Furthermore, more customers may be able to utilize businesses that the customers previously avoided because of the requisite time required for such activities. For example, a customer that does not have an hour total to travel to, shop, and return from a grocery store may minimize the time spent looking for a parking space.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of the embodiments of the invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method of broadcasting remote information relating to parking lot space availability, the method comprising:

determining the parking lot space availability of a first section of the parking lot;

determining the parking lot space availability of a second section of the parking lot;

transmitting the parking lot availability of the first section from a first transmitter to a first transmitting area;

transmitting the parking lot availability of the second section from a second transmitter to a second transmitting area;

receiving at a receiver the parking lot availability of the first and second sections when the receiver is within the first and second transmitting areas, respectively; and reserving an available parking lot space based upon received parking lot availability.

2. The method of claim 1, wherein the receiver has substantial uses other than receiving.

3. The method of claim 2, wherein the receiver comprises a personal data assistant.

4. The method of claim 1, wherein the receiver that has no substantial use other than receiving.

5. The method of claim 1, wherein the receiver has an identifying code, the code being unique to the device and capable of being broadcast from the receiver.

6. The method of claim 1, further comprising:

presenting the received remote information as text.

7. The method of claim 1, further comprising:

presenting the received parking lot availability of the first and second sections as a map.

8. The method of claim 1, further comprising:

presenting the received parking lot availability of the first and second sections as a voice.

9. A method of transmitting information related to a parking space, the method comprising:

determining a first vacancy status indicating whether a first parking space is vacant and a second vacancy status indicating whether a second parking space is vacant;

generating a first signal related to the first vacancy status and a second signal related to the second vacancy status;

sending the first signal to a first transmitter;

sending the second signal to a second transmitter;

transmitting the first signal remotely from the first transmitter within a first transmitting area;

transmitting the second signal remotely from the second transmitter within a second transmitting area;

receiving the first and second signals by a receiver when the receiver is within the first and second transmitting areas, respectively; and displaying the first and second signals as information related to the first vacancy status of the first parking space and the second vacancy status of the second parking space;

wherein the receiver has an identifying code, the code being unique to the receiver and capable of being broadcast from the receiver.

10. The method of claim 9, wherein the receiver has other primary uses and also displays the information.

11. The method of claim 10, wherein the receiver comprises a personal data assistant.

12. The method of claim 9, wherein the receiver has no substantial use other than to display the information.

13. The method of claim 9, wherein the information is displayed as text.

14. The method of claim 9, wherein the information is displayed as a map.

15. The method of claim 9, wherein the information is displayed as a voice.

16. A method for operating a parking facility, the method comprising:

providing a receiver to a customer entering the facility;

transmitting information from a first transmitter related to availability of parking spaces in a first parking section;

transmitting information from a second transmitter related to availability of parking spaces in a second parking section;

receiving that information relating to the first and second parking sections by the receiver; and conveying that information to a user.

17. The method of claim 16, wherein the receiver has other primary uses and also displays the information relating to the first and second parking sections.

18. The method of claim 17, wherein the receiver comprises a personal data assistant.

19. The method of claim 16, wherein the receiver has no substantial use other than to display the information relating to the first and second parking sections.

20. The method of claim 16, wherein the receiver has an identifying code, the code being unique to the receiver and capable of being broadcast from the receiver.

21. The method of claim 16, wherein the information relating to the first and second parking sections is displayed as text.

22. The method of claim 16, wherein the information relating to the first and second parking sections is displayed as a map.

23. The method of claim 16, wherein the information relating to the first and second parking sections is displayed as a voice.

24. A system for relaying information about parking space vacancy, the system comprising:

a first device for determining a first vacancy status of a first parking space;

a second device for determining a second vacancy status of a second parking space;

a first signal generator for generating a first signal that contains information relating to the first vacancy status;

a second signal generator for generating a second signal that contains information relating to the second vacancy status;

a first transmitter for receiving the first signal from the first signal generator and transmitting the first signal in a first transmitting area;

a second transmitter for receiving the second signal from the second signal generator and transmitting the second signal in a second transmitting area; and a receiver for receiving the first and second signals when the receiver is located within the first and second transmitting areas, respectively;

wherein the receiver has an identifying code, the code being unique to the receiver and capable of being broadcast from the receiver.

25. The system of claim 24, wherein the receiver has other primary uses and also receives the first and second signals.

26. The system of claim 25, wherein the receiver is a personal data assistant.

27. The system of claim 24, wherein the receiver has no substantial use other than to receive the first and second signals.

28. The system of claim 24, wherein the receiver is portable.

29. The system of claim 24, wherein the receiver is an integral component of a vehicle.

30. The system of claim 24, wherein information from the first and second signals is displayed as text on the receiver.

31. The system of claim 24, wherein information from the first and second signals is displayed as a map on the receiver.

32. The system of claim 24, wherein information from the first and second signals is displayed as a voice from the receiver.

33. A system for relaying information about parking space vacancy, the system comprising:

means for determining a first vacancy status of a fist parking space;

means for determining a second vacancy status of a second parking space;

means for generating a first signal that contains information relating to the first vacancy status;

means for generating a second signal that contains information relating to the second vacancy status;

means for receiving the first signal from said means for generating a first signal;

means for receiving the second signal from said means for generating a second signal;

means for transmitting the first signal remotely in a first transmitting area;

means for transmitting the second signal remotely in a second transmitting area;

means for receiving the first and second signals when the means for receiving the first and second signals is within the first and second transmitting areas, respectively; and means for providing information from the first and second signals to a user;

wherein the means for receiving the first and second signals when the means for receiving the first and second signals is within the first and second transmitting areas has a unique identifying code, which is broadcast.

34. The system of claim 33, wherein the means for receiving the first and second signals when the means for receiving the first and second signals is within the first and second transmitting areas has other primary uses and also receives the first and second signals.

35. The system of claim 34, wherein the means for receiving the first and second signals when the means for receiving the first and second signals is within the first and second transmitting areas comprises a personal data assistant.

36. The system of claim 33, wherein the means for receiving the first and second signals when the means for receiving the first and second signals is within the first and second transmitting areas has no substantial use other than to receive the first and second signals.

37. The system of claim 33, wherein the means for receiving the first and second signals when the means for receiving the first and second signals is within the first and second transmitting areas is portable.

38. The system of claim 33, web the means for receiving the first and second signals when the means for receiving the first and second signals is within the first and second transmitting areas is an integral component of a vehicle.

39. The system of claim 33, wherein the means for providing information is via text display.

40. The system of claim 33, wherein the means for providing information is via a map.

41. The system of claim 33, wherein the means for providing information is via a voice.

42. The method of claim 9, wherein determining whether a parking space is vacant further comprises using a weight sensor to determine whether a parking space is vacant.

43. The method of claim 9, wherein determining whether a parking space is vacant further comprises using infrared light to determine whether a parking space is vacant.

44. The method of claim 9, further comprising reserving parking at the first parking space vacancy when the first parking space is determined to be vacant.

* * * * *